US008274559B2

(12) United States Patent
Amling et al.

(10) Patent No.: US 8,274,559 B2
(45) Date of Patent: Sep. 25, 2012

(54) REPLACEABLE HARDWARE COMPONENT OF A CAMERA CONTROL UNIT FOR VIDEO SYSTEMS

(75) Inventors: Marc R. Amling, Santa Barbara, CA (US); David Chatenever, Santa Barbara, CA (US)

(73) Assignee: Karl Storz Imaging, Inc., Goleta, CA (US)

( * ) Notice: Subject to any disclaimer, the term of this patent is extended or adjusted under 35 U.S.C. 154(b) by 2817 days.

(21) Appl. No.: 10/034,273

(22) Filed: Dec. 28, 2001

(65) Prior Publication Data

US 2004/0028390 A9 Feb. 12, 2004

Related U.S. Application Data

(63) Continuation-in-part of application No. 10/039,931, filed on Nov. 9, 2001, now Pat. No. 7,212,227.

(51) Int. Cl.
*H04N 5/225* (2006.01)
*A61B 1/04* (2006.01)

(52) U.S. Cl. ...................... 348/72; 348/207.1
(58) Field of Classification Search ............... 348/72, 348/74, 75, 231.6, 207.99, 207.1, 211.4, 348/211.6, 211.9
See application file for complete search history.

(56) References Cited

U.S. PATENT DOCUMENTS

| | | | |
|---|---|---|---|
| 4,816,909 A * | 3/1989 | Kimura et al. ............... | 348/71 |
| 5,584,292 A * | 12/1996 | Cheung ...................... | 600/567 |
| 5,604,530 A | 2/1997 | Saito et al. | |
| 5,627,583 A * | 5/1997 | Nakamura et al. ........... | 348/72 |
| 5,754,422 A | 5/1998 | Lowles et al. | |
| 5,812,188 A | 9/1998 | Adair | |
| 5,868,666 A | 2/1999 | Okada et al. | |
| 5,871,439 A | 2/1999 | Takahashi et al. | |
| 5,896,166 A | 4/1999 | D'Alfonso et al. | |
| 6,184,922 B1 * | 2/2001 | Saito et al. .................. | 348/65 |
| 6,215,517 B1 | 4/2001 | Takahashi et al. | |
| 6,224,542 B1 | 5/2001 | Chang et al. | |
| 6,249,311 B1 | 6/2001 | Rouse, Jr. et al. | |
| 6,295,082 B1 | 9/2001 | Dowdy et al. | |
| 6,313,868 B1 | 11/2001 | D'Alfonso et al. | |
| 6,360,362 B1 | 3/2002 | Fichtner et al. | |
| 6,452,629 B1 | 9/2002 | Aizawa et al. | |
| 6,638,212 B1 * | 10/2003 | Oshima .................... | 600/109 |
| 6,707,490 B1 | 3/2004 | Kido et al. | |

(Continued)

FOREIGN PATENT DOCUMENTS

EP 0994614 A2 4/2000

(Continued)

OTHER PUBLICATIONS

The IEEE Standard Dictionary of Electrical and Electronics Terms, Sixth Edition, 1996, p. 1006.*

(Continued)

*Primary Examiner* — Timothy J Henn
(74) *Attorney, Agent, or Firm* — St. Onge Steward Johnston & Reens LLC

(57) ABSTRACT

A video imaging system is provided including a camera head for transmitting image data to a CCU, a CCU for receiving and processing the image data into a usable format, a storage device accessible by the camera control unit, information stored on the storage device, and wherein the information is used by the camera control unit for selecting hardware in the camera control unit to process the image data.

22 Claims, 4 Drawing Sheets

U.S. PATENT DOCUMENTS

| | | | |
|---|---|---|---|
| 6,710,799 | B2 | 3/2004 | Abnet et al. |
| 6,750,902 | B1 * | 6/2004 | Steinberg et al. .......... 348/211.3 |
| 7,212,227 | B2 * | 5/2007 | Amling et ........................ 348/72 |
| 8,089,509 | B2 * | 1/2012 | Chatenever et al. ............ 348/72 |
| 2001/0051762 | A1 | 12/2001 | Murata et al. |
| 2002/0095501 | A1 | 7/2002 | Chiloyan et al. |
| 2003/0076410 | A1 | 4/2003 | Beutter et al. |
| 2003/0220947 | A1 | 11/2003 | Doui |
| 2004/0028390 | A9 | 2/2004 | Chatenever et al. |
| 2004/0141054 | A1 * | 7/2004 | Mochida et al. ................ 348/76 |
| 2004/0201743 | A1 | 10/2004 | Amling et al. |
| 2004/0218065 | A1 | 11/2004 | Schinner |
| 2004/0225185 | A1 | 11/2004 | Obata et al. |
| 2005/0177669 | A1 | 8/2005 | Peters et al. |
| 2005/0228293 | A1 | 10/2005 | Cahill et al. |
| 2005/0278461 | A1 | 12/2005 | Ohta |
| 2006/0055793 | A1 | 3/2006 | Adler et al. |
| 2006/0092312 | A1 | 5/2006 | Tanaka |
| 2007/0124459 | A1 | 5/2007 | Kasama |
| 2008/0091065 | A1 | 4/2008 | Oshima et al. |
| 2008/0117442 | A1 | 5/2008 | Kosaka et al. |
| 2008/0218959 | A1 | 9/2008 | Wu et al. |
| 2009/0080562 | A1 | 3/2009 | Franson |
| 2009/0231684 | A1 | 9/2009 | Gonthier et al. |

FOREIGN PATENT DOCUMENTS

| | | |
|---|---|---|
| EP | 1311117 A2 | 5/2003 |
| EP | 1679030 A1 | 7/2006 |
| EP | 1739579 A1 | 1/2007 |
| EP | 1909490 A2 | 4/2008 |
| JP | 63153039 A | 6/1988 |
| JP | 5277065 A | 10/1993 |
| JP | 6285017 A | 10/1994 |
| JP | 11047089 | 2/1999 |
| JP | 11298907 A | 10/1999 |
| JP | 2000165960 A | 6/2000 |
| JP | 2000175089 A | 6/2000 |
| JP | 2000325293 A | 11/2000 |
| JP | 2001099627 A | 4/2001 |
| JP | 2001157200 A | 6/2001 |
| JP | 2001350104 A | 12/2001 |
| JP | 2002326679 A | 11/2002 |
| JP | 2003288211 A | 10/2003 |
| JP | 2004007368 A | 1/2004 |
| JP | 2004191911 A | 7/2004 |
| JP | 2005519719 A | 7/2005 |
| JP | 2006128968 A | 5/2006 |
| JP | 2006243997 A | 9/2006 |
| JP | 2006334247 A | 12/2006 |
| JP | 2007013574 A | 1/2007 |
| JP | 2007028188 A | 2/2007 |
| WO | 03099111 A1 | 12/2003 |

OTHER PUBLICATIONS

Anonymous: "Datacube introduces world's highest performance CameraLink frame grabber" Internet Article, 'Online! Oct. 30, 2001, XP002362612 Retrieved from the Internet: URL:www.datacube.com/downloads/MaxRevProdIntro.htm retrieved on Jan. 12, 2006! *the whole document*.

Anonymous: "MaxRevolution datasheet" Internet Article, 'Online! pp. 1-2, Retrieved from the Internet: URL:http://www.datacube.com/downloads/Datasheet_MaxRevolution.pdf retrieved on Jan. 12, 2006 * the whole document*.

European Search Report; Jan. 23, 2006; 4 pages.

European Search Report; EP 09 17 5038; Jan. 25, 2010; 9 pages.

European Search Report, EP07019564, Sep. 8, 2008, 2 Pages.

Laurence J. Thorpe, et al.; "The All-Digital Camcorder—The Arrival of Electronic Cinematography"; SMPTE Journal, vol. 105, No. 1; Jan. 1, 1996; pp. 13-30.

* cited by examiner

REPLACEABLE HARDWARE COMPONENT OF A CAMERA CONTROL UNIT FOR VIDEO SYSTEMS

This application is a continuation in part of Ser. No. 10/093,931, filed Nov. 9, 2001 U.S. Pat. No. 7,212,227 issued May 1, 2007.

FIELD OF THE INVENTION

The invention relates to a camera control unit for processing video signals from many different types of video cameras and, more particularly, the invention relates to selecting a replaceable and configurable hardware component.

BACKGROUND OF THE INVENTION

Cameras and Camera Control Units ("CCUs") are generally used together to acquire and process images. A camera and CCU may be housed as a single unit or may be separate from one another, being connected, for example, by a cable or wireless connection. A camera may be remotely held away from a CCU in situations where space is limited or mobility is desired, such as during endoscopic surgery. Cameras used during endoscopic surgery are typically referred to as heads or camera heads, which house single or multiple imaging devices, such as charge coupled devices and the like, for image acquisition. Typically, acquired, or picked up, image data is sent by the camera head to the CCU. Upon receiving the image data from the camera head, the CCU normally processes the signal to display the acquired image on a viewing device, which is generally used by a medical professional and/or for storage on various media (video cassette recorder, floppy disk, hard drives, compact disks, digital video disks, and the like) and/or for transmission to remote locations in various manners, such as by the Intranet, Internet, radio transmission, and the like.

Additionally, the CCU typically sends commands to the camera head to adjust various settings (i.e. color balance, electronic shutter for light sensitivity, and other optical and electronic characteristics).

Traditionally, CCUs are compatible with a limited number of camera heads. A CCU's hardware is usually difficult to configure for proper communication with varying types of camera heads because camera heads use varying types of imaging devices that can differ in pixel resolution, timing requirements (i.e. PAL, NTSC, Progressive, and other formats), signal output type (i.e. analog or digital), physical size, and in other characteristics.

Analog video system types differ in scanning principles, resolution capability, sampling rates, aspect ratios, synchronization, bandwidth, and the like. Moreover, video system types may differ between broadcast, closed circuit, and computer applications. Analog video systems are typically classified as either composite (luminance and chrominance components multiplexed into a single signal) or component (separate signals for each chrominance component, and synchronization signals). In broadcasting applications, composite formats are generally used. For closed circuit systems (such as video production and editing, medical, industrial, and scientific applications) typically component formats are used. The primary composite analog video standards usually used are PAL, NTSC, and SECAM, with one specific standard used in different geographical areas.

Digital video systems are typically differentiated by their application. Advanced television (ATV), high definition television (HDTV), and computer systems may differ in format and signal characteristics. In some areas, digital video formats and standards are currently being developed and adopted. The Society of Motion Picture and Television Engineers (SMPTE) is typically in the business of defining and adopting voluminous digital video formal standards. As each is adopted, various applications, and application improvements generally will also be realized. Some digital video standards currently in use are: IEEE-1394 FireWire®, ISO/IEC IS 13818, International Standard (1994), MPEG-2, and ITU-R BT.601-4 (1994) Encoding Parameters of Digital Television for Studios.

Furthermore, there may be variability from device to device of the same type, which could affect camera head performance. Additionally, commands sent from the CCU to the camera head are generally unique depending upon the camera head type being used. Moreover, as repairs, modifications, or improvements are made to camera heads, the CCU, which was originally designed to be compatible with the older camera head, may become incompatible and may require upgrading as well.

This overall variability in camera heads, either caused by imaging device technologies or by CCU command characteristics, often results in a CCU being specifically designed to be compatible with each camera head type utilized. Also, consumers may desire different capabilities related to specific applications of the cameras, such medical, industrial, and scientific uses. Capabilities include picture to picture, reverse video, electronic zoom, still image capture, and stereoscopic video interface.

Moreover, CCUs are typically designed for use with camera head technologies currently in existence, and not designed to anticipate and accommodate camera heads yet to be developed. Hence, CCUs are typically not designed to be compatible with future camera head technologies; particularly, image device and image signal transmission technologies. These differences between older and newer camera heads also contribute to compatibility problems.

Because CCUs are usually compatible with limited quantities of camera heads, CCUs are typically discarded in favor of ones that were designed concurrently and/or to be compatible with particular camera head technologies. Consequently, CCUs have become an added expense often associated with changing imaging devices or camera heads. Further, it is typically desired for camera heads to be improved due to the demand from consumers to have the latest technology and advancement in equipment. Moreover, CCUs used in medical and veterinary fields are increasingly being mounted permanently in equipment bays or carts and/or permanently mounted within the walls of surgical operating rooms themselves. The expense associated with replacing CCUs to maintain compatibility with camera heads is subsequently passed onto consumers.

U.S. Pat. No. 5,896,166 to D'Alfonso et al. ("'166 patent") generally relates to a video camera system for reading operating parameter information from a memory device located on the camera head and typically using the information to adjust the camera control unit. This often permits interchangeable camera heads to be used with camera control units.

However, the information is not usually transferred to, and stored on, the control unit to overwrite an overwritable or configurable portion of the control unit. Generally, the '166 patent does not disclose a configurable or programmable hardware device. Instead, the '166 patent only requires reading information from a memory device, which is located apart from the control unit. Also, the '166 patent does not typically relate to selecting hardware that is to process image data.

Additionally, the '166 patent does not typically relate to replaceable and configurable hardware coupled to the camera control unit.

U.S. Pat. No. 6,313,868 to D'Alfonso et al. ("'868 patent"), a continuation of the '166 patent, generally relates to a processor which reads, upon the camera head being operatively engaged to the control circuitry, data stored on a memory device. Generally, the '868 patent does not typically relate to data stored on the memory device for selecting hardware that is to process image data. Additionally, the '868 patent does not typically relate to replaceable and configurable hardware coupled to the camera control unit.

Therefore, what is desired is to provide a CCU that is capable of maintaining compatibility with camera heads utilizing various technologies. What is also desired is to provide data for selecting CCU hardware that is to process image data. What is further desired is to provide a CCU having replaceable and configurable hardware components, thereby resulting in a CCU capable of maintaining performance compatibility with various camera heads utilizing various technologies. Still another desire is to provide a CCU capable of adapting to application needs. Further, another desire is to provide a CCU having expandable and/or alterable capabilities as improvements become available.

SUMMARY OF THE INVENTION

Accordingly, it is an object of the invention to provide a video imaging system that selects a hardware component for configuring the CCU.

It is another object of the invention to provide a video imaging system that receives and uses information for selecting a configurable hardware component.

It is a further object of the invention to provide a video imaging system that selects a configurable hardware component from a plurality of replaceable hardware components.

These and other objects of the invention are achieved by providing a video imaging system which includes a camera head for transmitting image data to a CCU, a CCU for receiving and processing the image data into a usable format, a storage device accessible by the camera control unit, information stored on the storage device, and wherein the information is used by the camera control unit for selecting hardware in the camera control unit to process the image data.

In certain embodiments, the video imaging system further includes a camera head identifier received by the camera control unit for retrieving the information from the storage device. In further embodiments, the camera head transmits the camera head identifier. In certain other embodiments, the information routes the image data received by the camera control unit to the hardware that is capable of processing a specified type of image data. In still other embodiments, the camera head includes the storage device.

The invention further includes at least one replaceable hardware component on the camera control unit. The replaceable hardware component also includes a connector, wherein the connector receives the image data and outputs a signal processed from the image data. In certain embodiments, the hardware component should further be able to process at least two different types of image data.

In another embodiment of the invention, the video imaging system, includes a camera head for transmitting image data, a camera control unit for receiving and processing the image data from the camera head, and wherein the camera control unit further includes at least one replaceable hardware component.

In another embodiment, the video imaging system includes a camera head for transmitting image data, a camera control unit for receiving and processing the image data from the camera head, wherein the camera control unit includes at least one replaceable hardware component, and software executing on the camera control unit for selecting hardware in the camera control unit to process the image data.

In another aspect of the invention, a method for video imaging is provided including the steps of providing a camera for transmitting image data, providing a camera control unit for processing the transmitted image data, coupling a storage device to the camera control unit, storing information on the storage device, retrieving the information from the storage device, executing the information on the camera control unit, and selecting hardware in the camera control unit to process the image data.

The method further includes the step of coupling at least one replaceable hardware component to the camera control unit. In certain embodiments, the method further includes the step of configuring the at least one replaceable hardware component. In other embodiments, the method further includes the step of processing at least two different types of image data.

Further objectives and advantages of the invention will become more apparent from a consideration of the drawings and ensuing description.

DETAILED DESCRIPTION OF THE DRAWINGS

Figure 1:
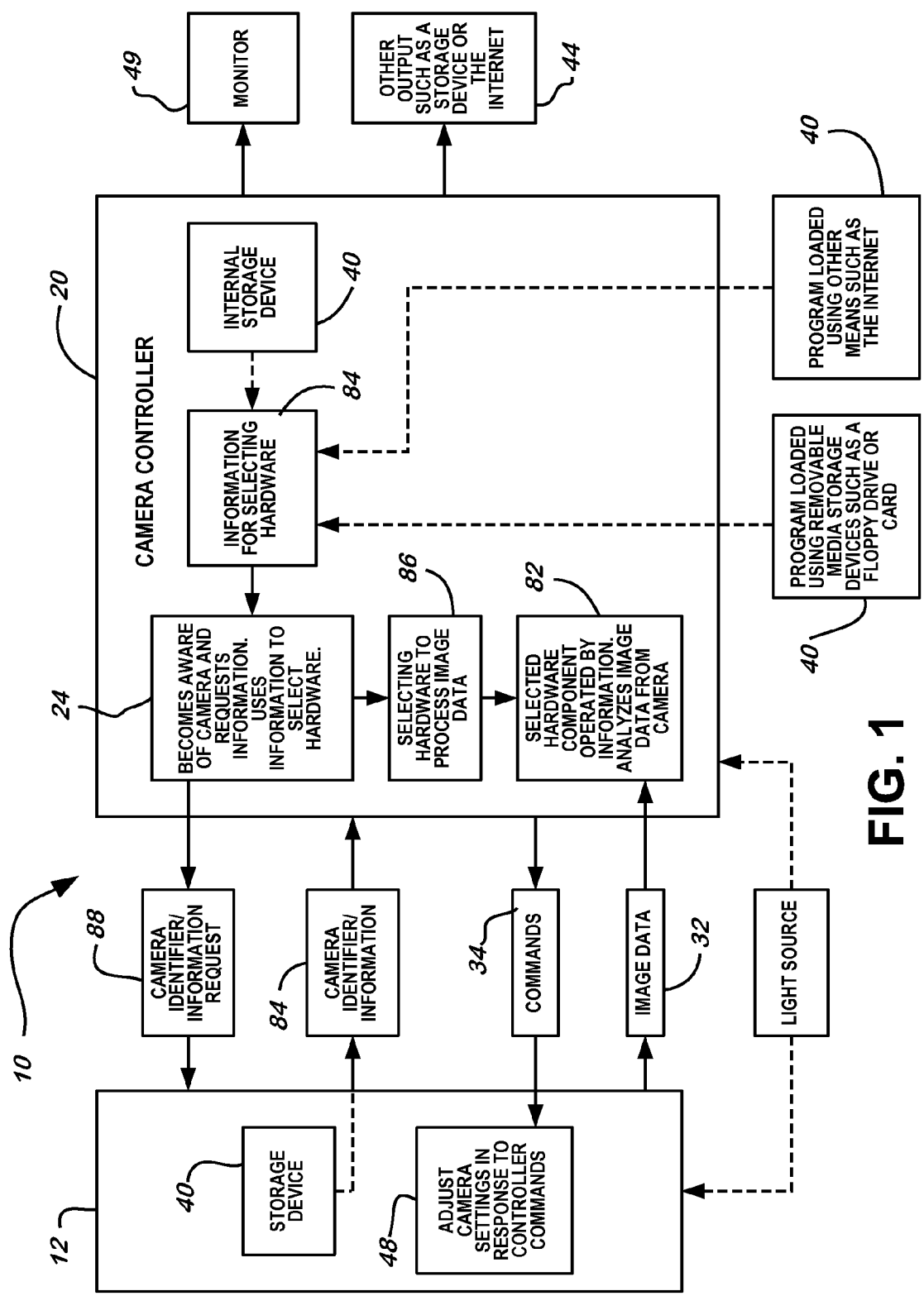
FIG. 1 depicts the system in accordance with the invention.

FIG. 1 depicts system 10 for video imaging, comprising a camera head 12 for transmitting image data, and camera control unit ("CCU") 20 for receiving and processing image data. System 10 further includes at least one storage device 40 for storing a program.

Camera head 12 acquires image data 32 and transmits it to a selected hardware component 82 for processing. Camera head 12 may include one or more imaging devices, utilizing a variety of technology types. Camera head 12 may further include known or novel imaging device types. Camera head 12 is interchangeable, or used together, with an endoscope or other medical instruments for transmitting image data.

CCU 20 is the main controller of the video system. It transmits commands 34 to camera head 12 to adjust 48 various settings and desired image data. Hardware component 82 then receives and processes the image data 32 transmitted from camera head 12 into a usable format for viewing, which includes viewing on a display 49.

Storage device 40 includes any medium for storing applications and/or programs. Storage device 40 may be located internally or externally of CCU 20 and/or camera head 12. In addition, storage device 40 may further be a removable storage medium or a remote location, such as the Intranet or Internet.

Once CCU 20 and camera head 12 are in communication, CCU 20 makes requests 88 for and/or receives 24 information 84, which is, in some embodiments, stored on storage device 40.

Figure 3:
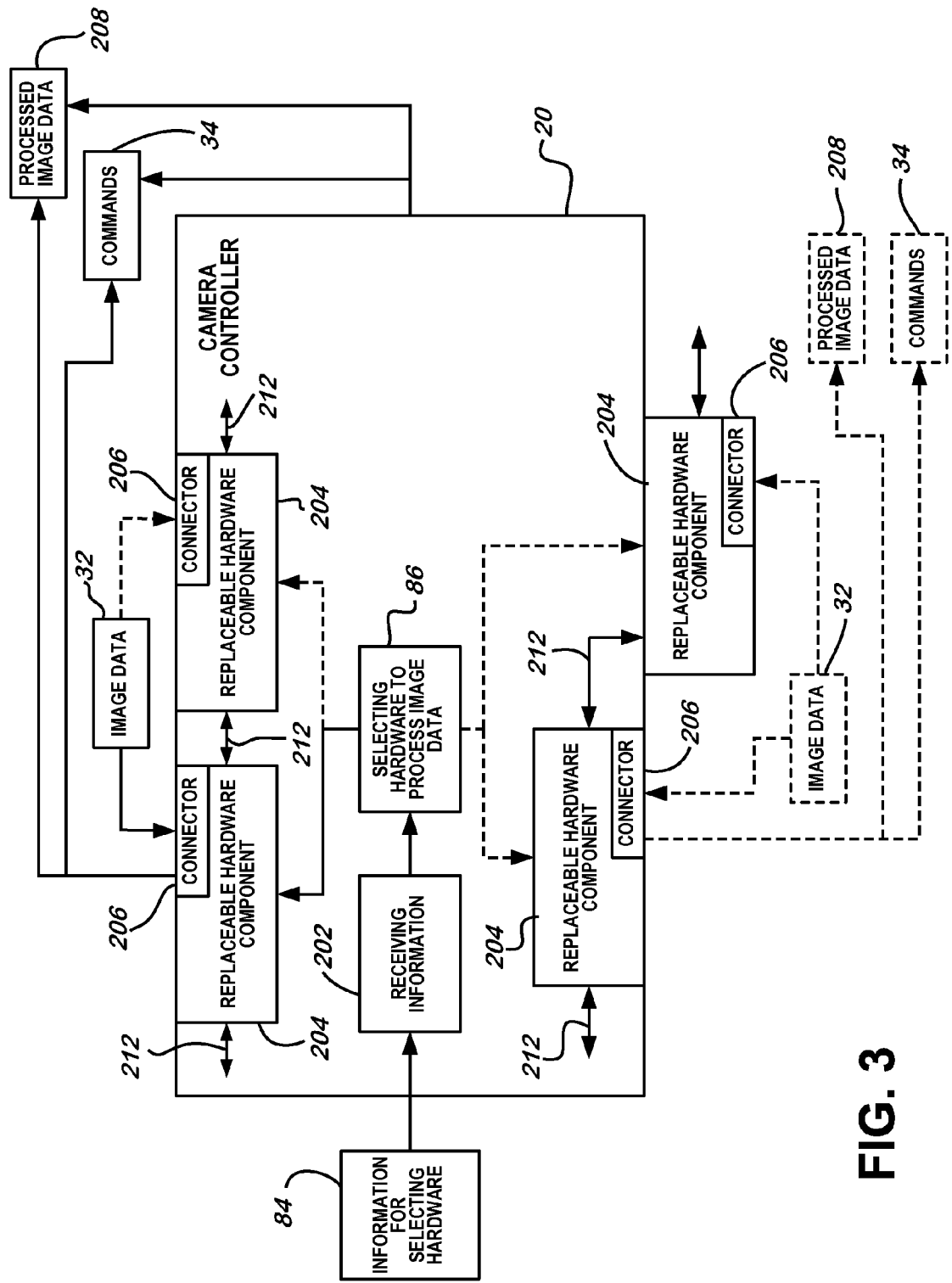
FIG. 3 depicts a more detailed view of the selected hardware component in accordance with FIG. 1.

In certain embodiments, request 88 includes a request for information 84 and/or for camera identifier, either of which indicates the type of camera 12 that is being coupled to CCU 20. Identifier and/or information 84 are unique to the different types of cameras with which they correspond. Camera identifier and/or information 84, therefore, provides useful data to CCU 20 so that the correct hardware component 82 is properly selected 86 to process image data 32. FIG. 3 more particularly depicts the selection of hardware component 82.

Once hardware component 82 has been selected, hardware component 82 receives and processes 28 image data 32 transmitted by camera head 12. Hence, CCU 20 may thereafter issue commands 34 to camera head 12 to adjust 48 its operating characteristics, and camera head 12 may send confirmation to CCU 20 that such commands were received and/or that camera head 12 will comply.

Figure 2:
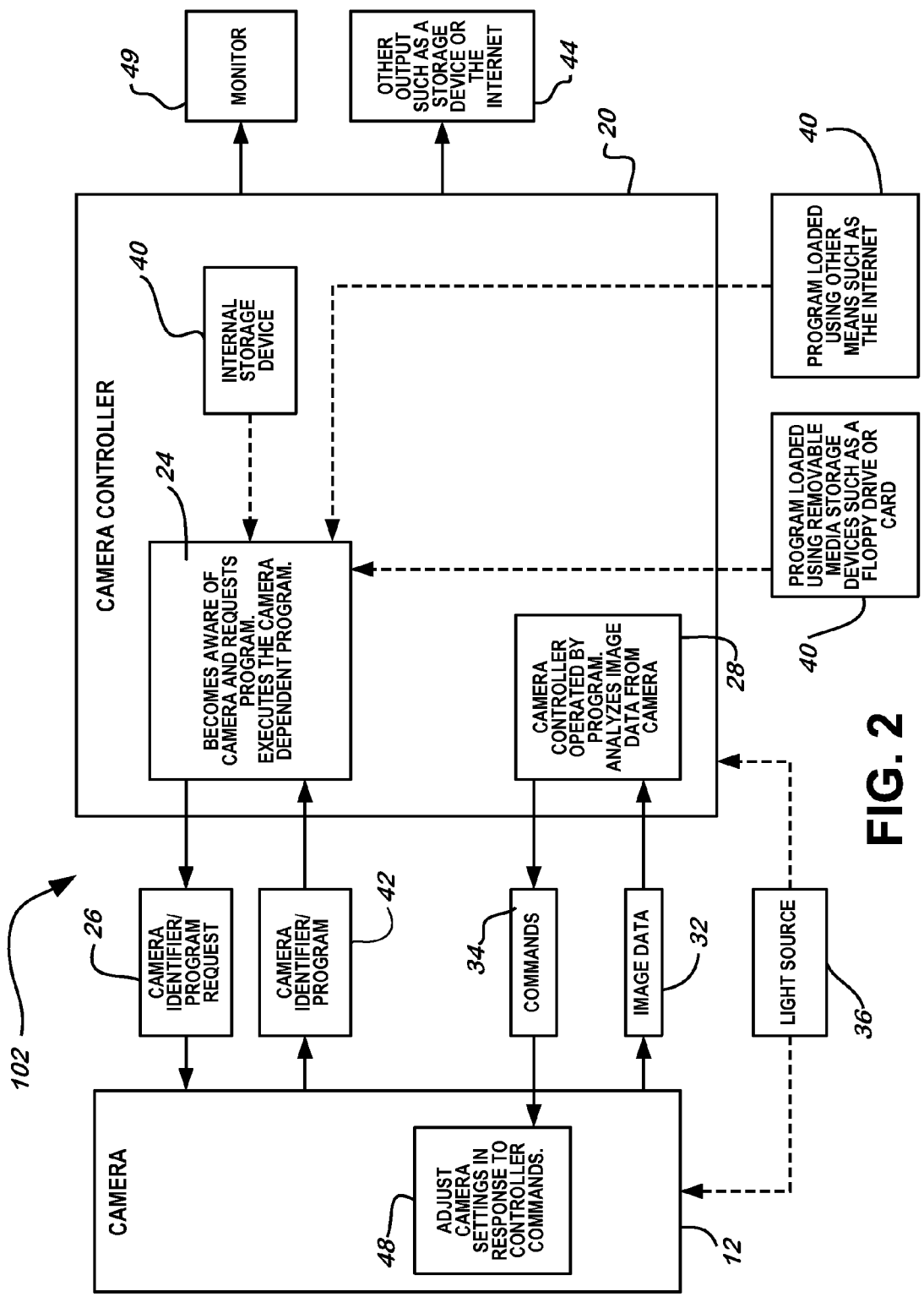
FIG. 2 depicts a more detailed view of the configurable hardware component in accordance with FIG. 1.

FIG. 2 depicts a more particular embodiment for video imaging. System 102 for video imaging includes a camera head 12 for transmitting image data, and CCU 20 for receiving and processing image data. System 102 further includes at least one storage device 40 for storing a program.

Camera head 12 acquires image data 32 and transmits it to CCU 20 to process 28 a usable image. Camera head 12 may include one or more imaging devices, utilizing a variety of technology types. Camera head 12 may further include known or novel imaging device types. Camera head 12 is interchangeable, or used together, with an endoscope or other medical instruments for transmitting image data.

CCU 20 is the main controller of the video system. It transmits commands 34 to camera head 12 to adjust various settings and desired image data 48. CCU 20 then receives and processes 28 the image data 32 transmitted from camera head 12 into a usable format for viewing, which includes viewing on a display 49.

Storage device 40 includes any medium for storing applications and/or programs. Storage device 40 may be located internally or externally of CCU 20 and/or camera head 12. In addition, storage device 40 may further be a removable storage medium or a remote location, such as the Intranet or Internet.

Once CCU 20 and camera head 12 are in communication, CCU 20 makes requests and/or receives 24 program 42, which is, in some embodiments, stored on storage device 40.

Once the program has been transmitted, CCU 20 executes the program that in turn modifies, or configures, CCU 20. In programming, or modifying/configuring, CCU 20, the program may overwrite an existing application contained in CCU 20. The existing application may have been used for compatibility purposes between CCU 20 and a pre-existing camera head (that is a camera head previously in communication with CCU 20). Because the pre-existing camera head has been replaced with camera head 12, the program may overwrite the existing application so that camera head 12 may be compatible with CCU 20. Once modified, or programmed and/or reconfigured, CCU 20 receives and processes 28 image data 32 transmitted by camera head 12. Hence, CCU 20 may thereafter issue commands 34 to camera head 12 to adjust 48 its operating characteristics, and camera head may send confirmation to CCU 20 that such commands were received and/or that camera head 12 will comply.

FIG. 3 more specifically depicts the hardware component of the invention. As shown, camera control unit 20 receives 202 information 84 for selecting hardware. As mentioned above under FIG. 1, information 84 is stored and transmitted from storage device 40. Once received, CCU 20 uses the information to select 86 which hardware component or components, from a plurality of replaceable hardware components 204, to process image data.

Selecting 86 which replaceable hardware component 204 to process image data 32 includes using information 84 to determine or specify which component or components of the plurality of replaceable hardware components to process image data 32. Selecting 86 hardware further includes, after specifying component 204, using or causing CCU 20 to use information 84 to route image data 32 to the specified component. In certain embodiments, selecting 86 hardware also includes processing or causing CCU 20 to process the hardware. This includes executing a program on CCU 20 for processing image data 32.

Replaceable hardware component 204 is configured to enable CCU 20 to process image data 32 into a useable signal, such as a viewable image on a monitor 49 or other output 44. Image data 32 is inputted into connector 206, which is coupled to replaceable hardware component 204 for configuration. Additionally, the processed 208 image data is outputted from replaceable hardware component 204 via connector 206 or via CCU 20, as shown. Replaceable hardware component 204 also issues commands 34 via connector 206 and/or CCU 20 to camera head 12 to adjust camera settings via connector 206.

Connector 206 connects the image data transmissions to component 204. In certain embodiments, image data 32 is transmitted through a wire and has a serial port connection at the end of the wire that requires a mating serial port at the connector to transmit image data 32. In other embodiments, image data is transmitted through a wire with a USB port, which requires a mating USB port at the connector. Still, in other embodiments, wires use other types of ports to transmit image data to connector 206. Therefore, the invention provides a plurality of connectors 206 to accommodate various types of connections for receiving image data 32 from camera 12. In certain embodiments, connector 206 is an adapter to adapt the image data connection to the replaceable hardware component connection.

In certain embodiments, component 204 and connector 206 are a part of CCU 20, where image data 32 and processed image data 208 are transmitted to and from connector 206 at a point located on CCU 20. In other embodiments, external connector 207 is accessible from outside CCU 20. External connector 207 includes all the limitations of connector 206 but is positioned external of CCU 20 so that image data 32 and processed image data 208 are transmitted to and from external connector 207 at a point located outside of CCU 20, such as a port. Similarly, in certain embodiments, external replaceable hardware component 205 includes all the limitations of component 204 but is further external of CCU 20 so that it processes image data outside of CCU 20.

In certain embodiments where external replaceable hardware component 205 is accessible outside of CCU 20, external component 205 includes a module, cartridge, circuit board, or any pluggably connected configurable hardware.

A plurality of replaceable hardware components are provided to accommodate various types of image data for processing. Image data 32 is not typically capable of being processed by a single universal hardware component because image data 32 varies according to protocol, format, or other characteristics. Therefore, the invention provides a plurality of replaceable hardware components 204 for processing image data 32. In certain embodiments, replaceable hardware component 204 is a module that plugs into CCU 20.

Component 204 plugs into CCU 20 via bus 212, which provides command, control, and communication connectivity between component 204 and CCU 20. Protocol characteristics of bus 212 are dictated by the requirements of component 204 that is connected to bus 212.

In certain embodiments, component 204 includes a storage device, video switch, and component processor. The storage device stores functionality data related to specific functionality of the replaceable hardware component to which the storage device is a part. The video switch receives processed image data from the component processor and routes it according to commands issued by CCU 20.

The component processor is a device that receives and executes software, such as field programmable gate arrays and computer programmable logic devices. The storage device is accessible to the component processor so that programs, such as the functionality data, on the storage device can be executed by the component processor to modify component 204.

Although four replaceable hardware components 204 are shown in FIG. 3, this is merely for exemplary purposes since more or less components 204 may be used. Also, because the type of hardware component to be used by the invention depends upon the type of image data, and its connection to connector 206, and that image data and connections can vary greatly, component 204 is removable and replaceable with other replaceable hardware components that are better suited to process the desired image data.

If the number and types of replaceable hardware components in CCU 20 were fixed, the invention's versatility would be limited. Providing every type of component and connector in CCU 20 would increase the size of CCU 20, making it bulkier to maneuver than needed. Even providing every type of component and connector in CCU 20 would unduly limit the invention in the years to come, when new types of cameras and, therefore, image data requirements may render CCU 20 outdated. Therefore, component 204 is a removable and replaceable hardware component that can be interchanged with other configurable hardware components.

In some embodiments, connector 206 is a permanent part of component 204 whereby switching component 204 also means switching connector 206. in other embodiments, plurality of components 204 and plurality of connectors 206 are capable of being mixed and matched to accommodate image data 32.

Determining which component of a plurality of components to use to process image data is determined by CCU 20, which uses information 84 in order to select the component(s) for processing the image data. In certain embodiments, more than one component 204 is selected, as shown by the dashed lines. Similarly, more than one connector 206 is selected, also shown by the dashed lines. CCU 20 can select more than one replaceable hardware component to receive and process more than one type of image data when, for example, at least two different types of image data are transmitted to CCU 20. In certain embodiments, this occurs when different cameras 12 are being used, which in turn transmit varying image data to CCU 20. In these embodiments, CCU 20 contemporaneously processes multiple types of image data.

In certain embodiments, replaceable hardware component 204 includes an internal component processor, internal component storage device, a data bus, and a video bus. In certain other embodiments, replaceable hardware component 204 further includes a field programmable gate array and/or computer programmable logic device.

The component processor is any type of device capable of receiving and executing software programs. In some embodiments, the component processor includes a digital signal processor, microcontroller, or a microprocessor.

The component storage device is any storage medium accessible by the component processor and, in certain embodiments, is storage medium 40.

The data bus provides command, control, and communication connectivity for CCU 20 and all components 204. The video bus transmits information related to the image data going to and from component 204. Furthermore, in certain embodiments, the video bus is universal in that it accepts pluggably standard-sized hardware components. In further embodiments, the video bus transmits data related only to imaging. Hence, no textual data is transmitted.

Figure 4:
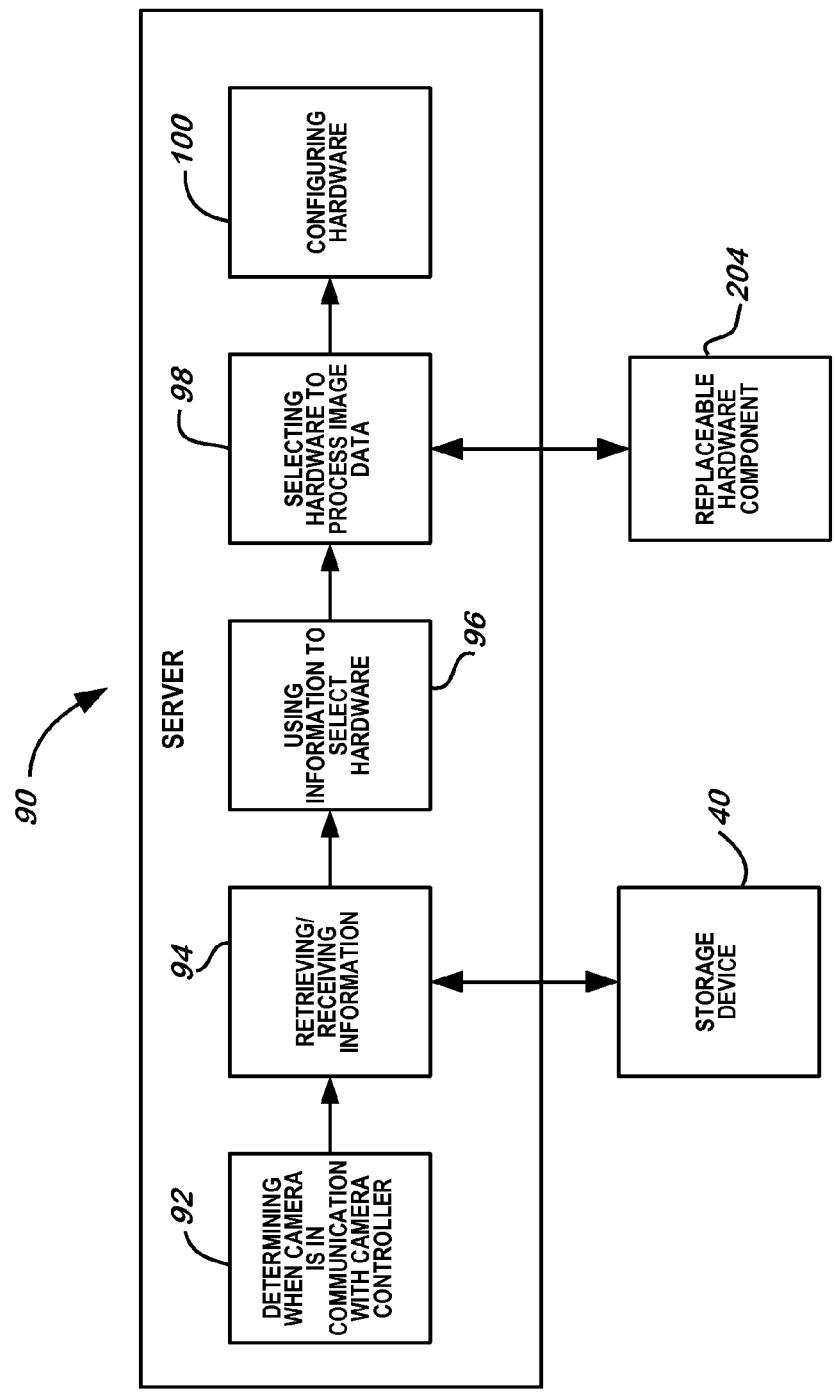
FIG. 4 depicts a block diagram of a method for video imaging in accordance with FIG. 1.

FIG. 4 depicts a block diagram of a method 90 for video imaging comprising the steps of determining 92 when camera 12 is in communication with control unit 20, retrieving 94 information 84 from storage device 40, using 96 information 84 to select hardware, selecting 98 the type of replaceable hardware component 204 to process image data, and configuring 100 replaceable hardware component 204 to be compatible with camera 12.

An electronic system determines 92 when control unit 20 and camera 12 are in communication with each other. The electronic system may determine 92 the communication through any number of ways including a mechanical switch, RF, optical, electrical, or magnetic coupling, signal, or the like.

Upon determining 92 communication between camera 12 and control unit 20, control unit 20 retrieves/receives 94 information 84 from storage device 40, which includes any medium for storing applications and/or information 84.

After information 84 has been retrieved/received 94, control unit 20 uses 96 the information to select the appropriate hardware component 204 to process the image data. Using 96 information 84 includes opening, compiling, and/or running a program, whereby the program is launched and performs the functions/operations for which the program was written.

Concurrent with or after using 96 information 84, method includes programming or configuring 100 control unit 20 to enable control unit 20 to process image data 32 transmitted from camera 12. Programming or configuring 100 control unit 20 may include reprogramming/overwriting an existing application on control unit 20.

Once programmed, control unit 20 may thereafter issue commands to camera 12 and process image data 32 transmitted from camera 12. Control unit 20 may further send the processed image data to a displayable medium, such as a monitor, or to a second storage device, such as recording device 44 or an Internet location.

Although the invention has been described with reference to a particular arrangement of parts and/or features, many other modifications and variations will be ascertainable to those of skill in the art.

What is claimed is:

1. A video imaging system, comprising:
   a camera head for transmitting image data;
   a camera control unit for receiving and processing said image data from said camera head, said camera control unit having a detachable configurable component; said detachable configurable component including a processor;
   a storage device accessible by said camera control unit; and
   a software program stored on said storage device;
   said camera control unit receiving said software program and overwriting an existing software program on said processor, said processor configuring said detachable configurable component for processing the image data, wherein said detachable configurable component is completely removable from said camera control unit such that a different detachable configurable component is installable in said camera control unit.

2. The video imaging system according to claim 1, further comprising a camera head identifier received by said camera control unit for retrieving said information from said storage device.

3. The video imaging system according to claim 2, wherein said camera head transmits said camera head identifier.

4. The video imaging system according to claim 1, wherein said camera head includes said storage device.

5. The video system according to claim 1, wherein said program specifies said at least one replaceable hardware component.

6. The video system according to claim 1, wherein said at least one replaceable hardware component further includes a memory device.

7. The video system according to claim 1, wherein said at least one replaceable hardware component further includes a field programmable gate array.

8. The video system according to claim 1, further comprising a video bus and said at least one replaceable hardware component attaches to said video bus.

9. The video imaging system according to claim 1, wherein said replaceable hardware component includes a connector.

10. The video imaging system according to claim 9, wherein said connector receives the image data.

11. The video imaging system according to claim 9, wherein said connector outputs a signal processed from the image data.

12. The video imaging system according to claim 1, wherein said camera control unit further comprises hardware capable of processing at least two different types of image data.

13. The video imaging system according to claim 1, wherein said information routes the image data received by said camera control unit to the hardware capable of processing a specified type of image data.

14. The video imaging system according to claim 1, wherein said information enables said camera control unit to issue commands to said camera head.

15. A video imaging system, comprising:
a camera head for transmitting image data; and
a camera control unit receiving and processing the image data from said camera head;
said camera control unit having a detachable configurable component comprising a processor;
said camera control unit receiving a software program and overwriting an existing software program on said processor, said processor configuring said detachable configurable component for processing the image data, wherein said detachable configurable component is completely removable from said camera control unit such that a different detachable configurable component is installable in said camera control unit.

16. The video imaging system according to claim 15, further comprising a storage device accessible by said camera control unit.

17. The video imaging system according to claim 16, wherein said program is stored on said storage device.

18. The video imaging system according to claim 15, further comprising a connector for outputting a signal processed from the image data.

19. The video imaging system according to claim 15, wherein said at least one replaceable hardware component processes at least two different types of image data.

20. A video imaging system, comprising:
a camera head transmitting image data;
a camera control unit receiving and processing the image data from said camera head;
said camera control unit having a detachable configurable component comprising a processor; and
a software program executing on said processor and overwriting an existing software program on said processor, said processor configuring said detachable configurable component in said camera control unit to process the image data;
wherein said detachable configurable component is completely removable from said camera control unit such that a different detachable configurable component is installable in said camera control unit.

21. The video imaging system according to claim 20, further comprising a storage device accessible by said camera control unit.

22. The video imaging system according to claim 21, wherein said program for configuring the processor is stored on said storage device.

* * * * *